(12) United States Patent
Cheng et al.

(10) Patent No.: US 10,808,914 B2
(45) Date of Patent: Oct. 20, 2020

(54) SEALED LIGHTING APPARATUS WITH MODULAR LIGHT DEVICES

(71) Applicant: National Kaohsiung University of Science and Technology, Kaohsiung (TW)

(72) Inventors: Jui-Hung Cheng, Kaohsiung (TW); Te-Hua Fang, Kaohsiung (TW)

(73) Assignee: National Kaohsiung University of Science and Technology, Kaohsiung (TW)

( * ) Notice: Subject to any disclaimer, the term of this patent is extended or adjusted under 35 U.S.C. 154(b) by 0 days.

(21) Appl. No.: 16/673,248

(22) Filed: Nov. 4, 2019

(65) Prior Publication Data
US 2020/0141559 A1 May 7, 2020

(30) Foreign Application Priority Data

Nov. 7, 2018 (TW) .............................. 107139490 A
Nov. 7, 2018 (TW) .............................. 107139491 A

(51) Int. Cl.
| F21V 31/00 | (2006.01) |
| F21V 7/00 | (2006.01) |
| F21V 15/01 | (2006.01) |
| F21S 10/02 | (2006.01) |
| F21Y 105/10 | (2016.01) |
| F21Y 115/10 | (2016.01) |

(52) U.S. Cl.
CPC ............ *F21V 7/0083* (2013.01); *F21S 10/02* (2013.01); *F21V 15/01* (2013.01); *F21V 31/005* (2013.01); *F21Y 2105/10* (2016.08); *F21Y 2115/10* (2016.08)

(58) Field of Classification Search
CPC ........ F21V 15/01; F21V 15/013; F21V 31/00; F21Y 2107/30; F21Y 2107/40; F21Y 2107/50; F21W 2107/20; F21W 2111/047
See application file for complete search history.

(56) References Cited

U.S. PATENT DOCUMENTS

| 484,449 | A | * | 10/1892 | Page et al. | .............. F21V 31/00 362/267 |
| 516,824 | A | * | 3/1894 | Knowles et al. | ..... F21V 29/503 362/240 |
| 1,732,745 | A | * | 10/1929 | Erskine | ................... F21V 5/045 362/227 |
| 5,567,036 | A | * | 10/1996 | Theobald | ............. B60Q 1/2607 362/485 |
| 6,425,678 | B1 | * | 7/2002 | Verdes | .................... F21V 29/74 362/244 |
| 6,582,100 | B1 | * | 6/2003 | Hochstein | ............. F21V 19/004 362/294 |

(Continued)

*Primary Examiner* — Ismael Negron
(74) *Attorney, Agent, or Firm* — Muncy, Geissler, Olds & Lowe, P.C.

(57) ABSTRACT

A lighting apparatus includes an outer housing surrounding a longitudinal axis and made of light-transmissive material, a supporting mount provided within the outer housing, a pair of end caps coupled to opposite ends of the outer housing and supporting mount to define a watertight internal chamber, and a plurality of lighting devices provided on a surface of the supporting mount inside the internal chamber. Each of the lighting devices includes a circuit component and a lighting module detachably mounted to the circuit component.

12 Claims, 9 Drawing Sheets

(56) References Cited

U.S. PATENT DOCUMENTS

| | | | | |
|---|---|---|---|---|
| 7,079,041 B2* | 7/2006 | Fredericks | ............ | B64D 47/06 |
| | | | | 340/815.45 |
| 7,581,856 B2* | 9/2009 | Kang | .................... | F21V 29/004 |
| | | | | 362/373 |
| 9,249,955 B2* | 2/2016 | Schroll | ................. | F21V 29/507 |
| 2002/0122309 A1* | 9/2002 | Abdelhafez | ............ | F21V 29/80 |
| | | | | 362/294 |
| 2005/0146884 A1* | 7/2005 | Scheithauer | ............ | F21S 45/47 |
| | | | | 362/470 |
| 2010/0327725 A1* | 12/2010 | Huang | ................. | F21V 7/0025 |
| | | | | 313/46 |
| 2011/0255284 A1* | 10/2011 | Hiller | ........................ | F21V 5/02 |
| | | | | 362/249.02 |

\* cited by examiner

SEALED LIGHTING APPARATUS WITH MODULAR LIGHT DEVICES

CROSS-REFERENCE TO RELATED APPLICATION

This application claims priority from Taiwanese invention patent application nos. 107139490 and 107139491, filed on Nov. 7, 2018.

FIELD

The disclosure relates to an underwater lighting apparatus, more particularly to a modular underwater lighting apparatus.

BACKGROUND

Underwater light sources may be used as fish-lamp, or as a means for transmitting message underwater through change of the flickering frequency of the light sources. And an increase in use of light emitting diodes as the source of light for underwater lighting can be attributed to longer service life, better light transmittance, and small in volume.

As shown in FIG. 1, a conventional underwater lighting apparatus 1 may include a heat sink mount 11 formed with a plurality of retaining grooves 110, a plurality of circuit boards 12 respectively retained in the retaining grooves 110, a light transmissive wall 14 disposed to surround the heat sink mount 11 and the circuit boards 12, and two end caps 15, 16 respectively mounted on upper and lower ends of the light transmissive wall 14. A plurality of light emitting diodes 13 are secured on each of the circuit boards 12. If one of the light emitting diodes 13 malfunctions, the corresponding circuit board 12 should be detached for repair. In addition, a user may prepare a plurality of the underwater lighting apparatuses 1 for respectively emitting light of different wavelengths so as to attract fish in different depths or fish of different species.

SUMMARY

Therefore, an object of the disclosure is to provide a novel modular underwater lighting apparatus which includes a plurality of lighting devices each including a circuit component and a lighting module mounted detachably to the circuit component.

According to the disclosure, a modular underwater lighting apparatus includes an outer housing, a supporting mount, and a plurality of lighting devices. The outer housing includes an outer surrounding wall extending to surround a longitudinal axis and made of a light-transmissive material. The supporting mount is mounted inside the outer housing. The lighting devices are separately mounted on the supporting mount. Each of the lighting devices includes a circuit component and a lighting module which is detachably mounted to the circuit component.

BRIEF DESCRIPTION OF THE DRAWINGS

Other features and advantages of the disclosure will become apparent in the following detailed description of the embodiment (s) with reference to the accompanying drawings, in which.

DETAILED DESCRIPTION

Figure 1:
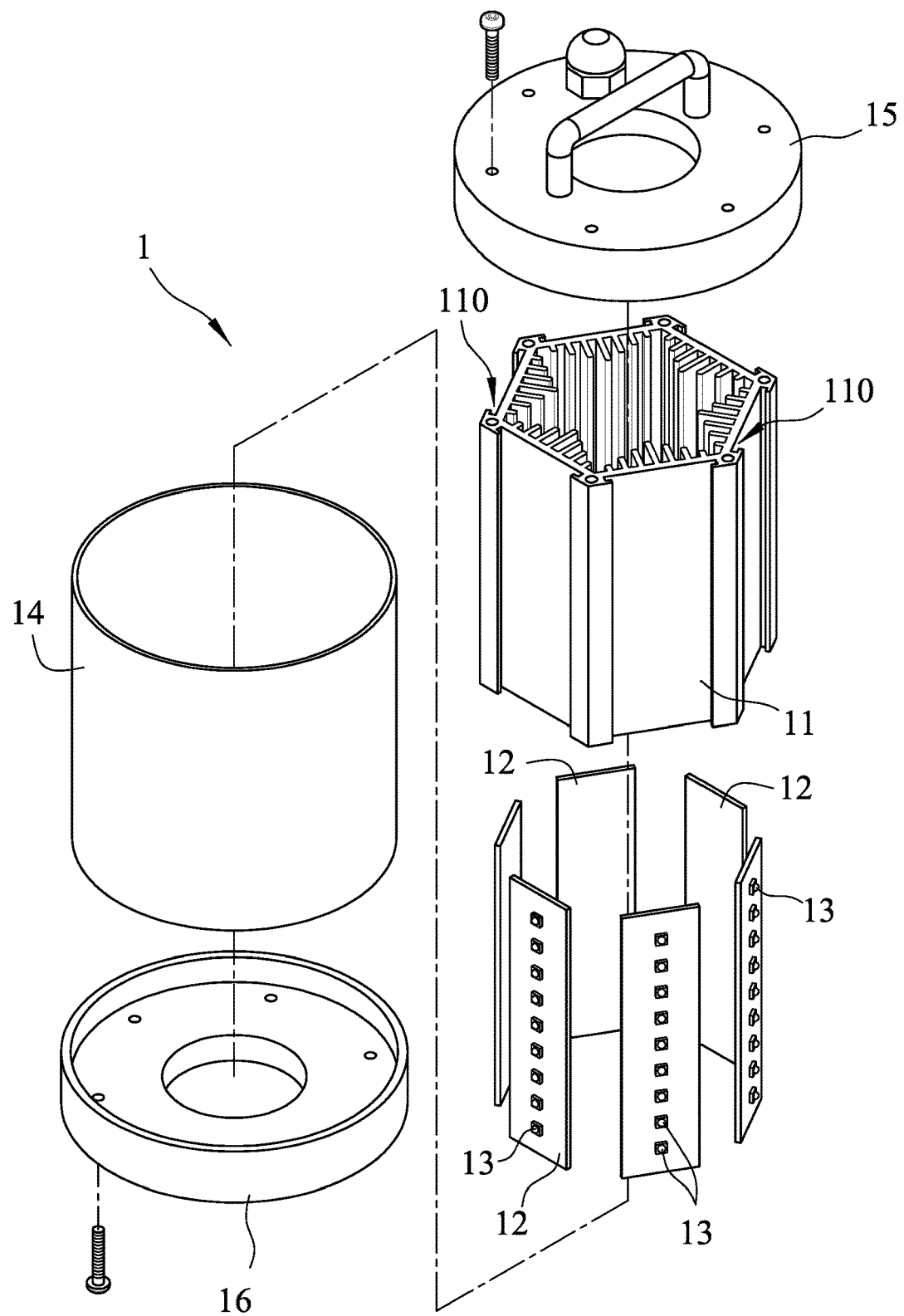
FIG. 1 is an exploded perspective view of a conventional underwater lighting apparatus.

Before the disclosure is described in greater detail, it should be noted that where considered appropriate, reference numerals have been repeated among the figures to indicate corresponding or analogous elements, which may optionally have similar characteristics.

Figure 2:
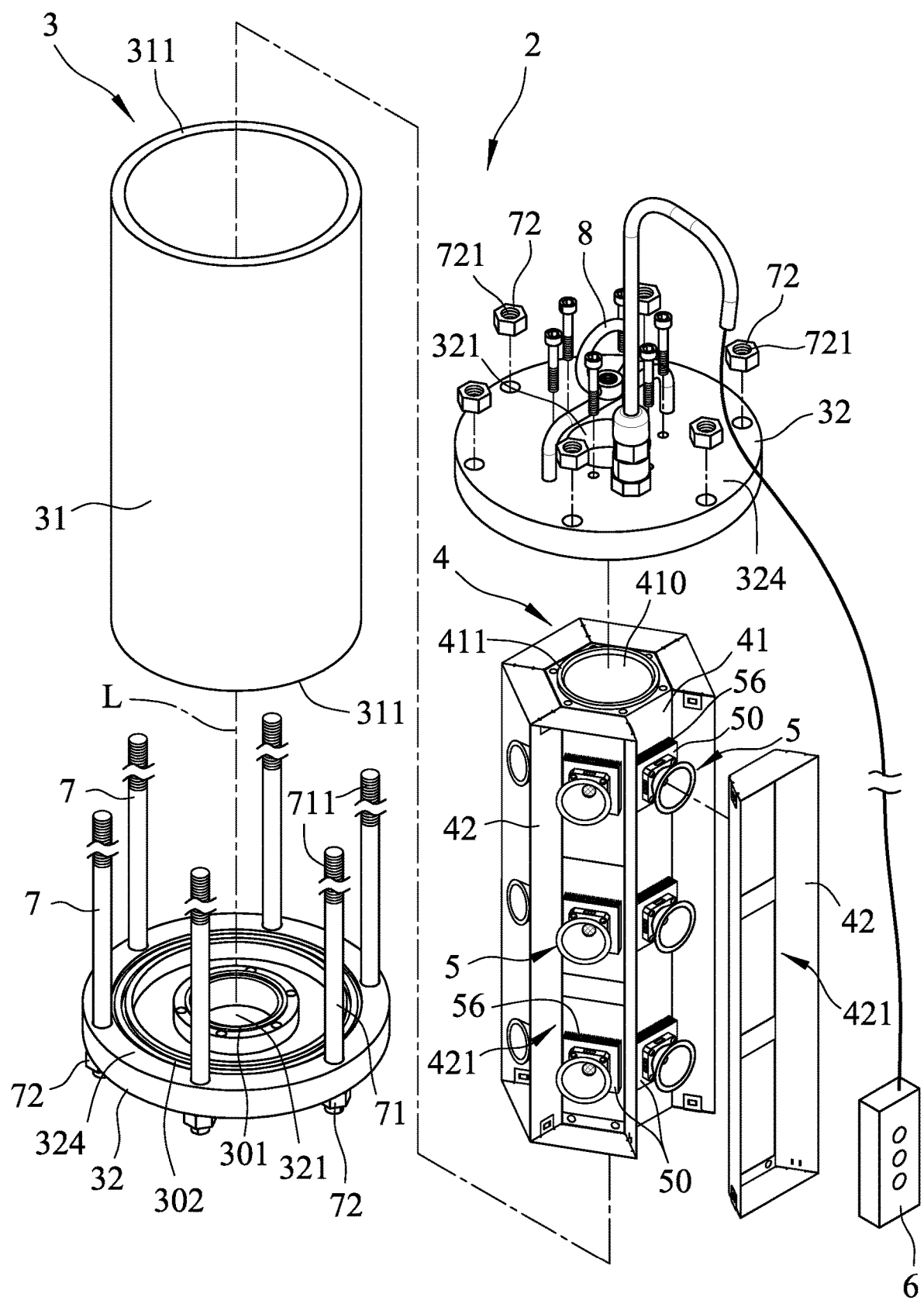
FIG. 2 is a partial exploded perspective view of a modular underwater lighting apparatus according to a first embodiment of the disclosure.
Figure 3:
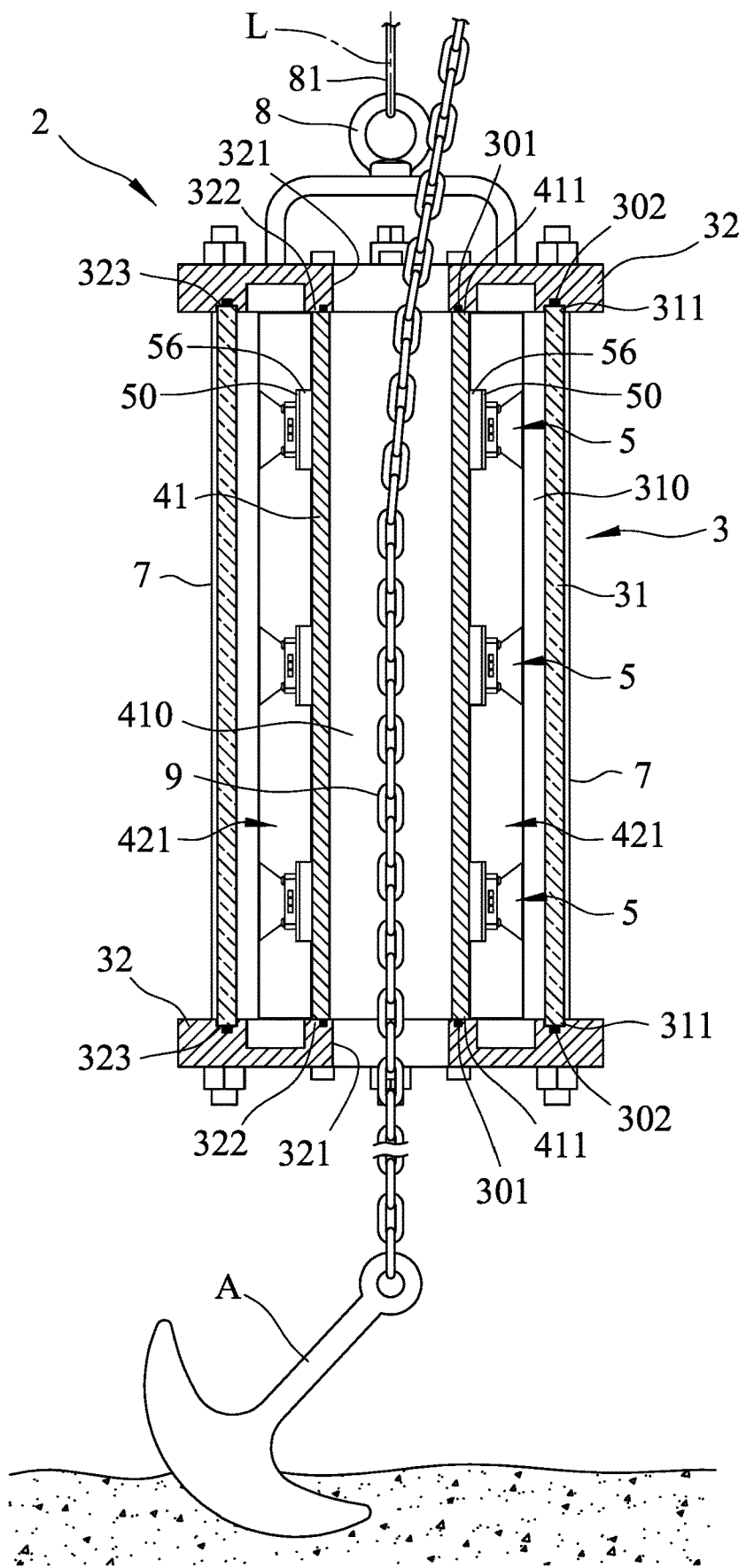
FIG. 3 is a partial cross-sectional view of the first embodiment.
Figure 4:
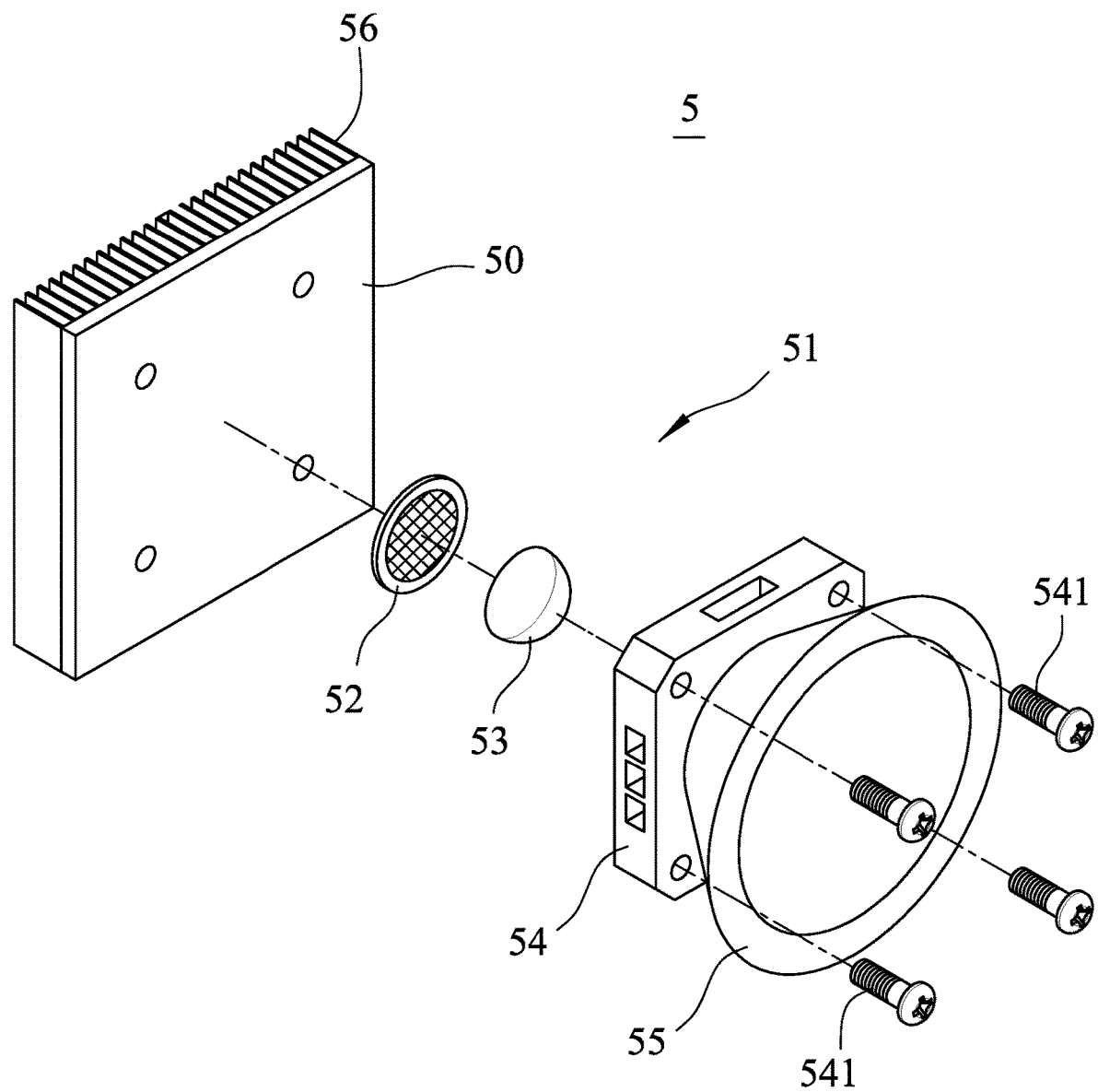
FIG. 4 is an exploded perspective view of a lighting device of the modular underwater lighting apparatus of the first embodiment.

Referring to FIGS. 2 to 4, a modular underwater lighting apparatus 2 according to a first embodiment of the disclosure is shown to include an outer housing 3, a supporting mount 4, and a plurality of lighting devices 5.

The outer housing 3 includes an outer surrounding wall 31 which extends to surround a longitudinal axis (L), and which is made of a light-transmissive material. In an embodiment shown in FIGS. 2 and 3, the outer surrounding wall 31 has two opposite outer wall ends 311 in a direction of the longitudinal axis (L).

The supporting mount 4 is mounted inside the outer housing 3. In an embodiment shown in FIGS. 2 and 3, the supporting mount 4 includes an inner surrounding wall 41 which extends to surround the longitudinal axis (L), and which has two opposite inner wall ends 411 in the direction of the longitudinal axis (L). The inner surrounding wall 41 is disposed inwardly of the outer surrounding wall 31 so as to define an internal chamber 310 between the outer and inner surrounding walls 31, 41.

In an embodiment shown in FIGS. 2 and 3, the supporting mount 4 may further include a plurality of positioning frames 42 which are respectively mounted on the inner surrounding wall 41, and which are displaced from each other about the longitudinal axis (L).

The lighting devices 5 are separately mounted on the supporting mount 4. Each of the lighting devices 5 includes a circuit component 50 and a lighting module 51 which is detachably mounted to the circuit component 50. Depending upon requirement, a user can select the lighting devices 5, which can emit light of a desired luminance and wavelength, to mount on the supporting mount 4, and thus, it is not necessary for the user to prepare a plurality of the underwater lighting apparatuses for respectively emitting light of different wavelengths so as to attract fish in different depths or fish of different species.

In an embodiment shown in FIGS. 2 and 3, the lighting devices 5 are separately mounted on the inner surrounding wall 41 to be disposed in the internal chamber 310. The positioning and number of the lighting devices 5 may be adjusted based on the user requirements.

In an embodiment shown in FIGS. 2 and 3, the lighting devices 5 are arranged into a plurality of rows of the lighting devices 5 by virtue of the positioning frames 42. The rows of the lighting devices 5 are displaced from each other about the longitudinal axis (L).

In an embodiment shown in FIGS. 2 and 3, each of the positioning frames 42 defines a positioning groove 421 which extends in the direction of the longitudinal axis (L) for receiving and positioning the respective row of the lighting devices 5.

In an embodiment shown in FIGS. 2 to 4, the lighting module 51 includes a light emitting element 52 and a mounting frame 54. The light emitting element 52 is configured to be brought into electrical contact with the circuit component 50. The mounting frame 54 is configured to detachably couple the light emitting element 52 to the circuit component 50 so as to bring the light emitting element 52 into electrical contact with the circuit component 50 and so as to permit light from the light emitting element 52 to pass through the mounting frame 54 to emanate outwardly.

In an embodiment, the light emitting element 52 may be a chip-on-board light emitting diode or a light emitting diode chip, and may have, for example, 300 watt power.

In an embodiment, each of the lighting devices 5 may have a battery (not shown) which may be mounted on the circuit component 50 for supplying electricity to the light emitting element 52.

In an embodiment shown in FIG. 4, the mounting frame 54 may detachably couple the light emitting element 52 to the circuit component 50 by virtue of fastening screws 541. In other non-shown embodiments, the mounting frame 54 may be integrally formed with the light emitting element 52. In addition, the mounting frame 54 may be detachably coupled to the circuit component 50 through a bayonet connection or a screw connection.

In an embodiment shown in FIG. 4, the lighting module 51 may further include a lens 53 mounted to encapsulate the light emitting element 52.

In an embodiment shown in FIG. 4, the lighting module 51 may further include a reflective cup 55 disposed on the mounting frame 54 for reflecting the light from the light emitting element 52.

In an embodiment shown in FIGS. 2 to 4, each of the lighting devices 5 may further include a heat sink 56 disposed between the circuit component 50 and the inner surrounding wall 41. The heat sink 56 may detachably couple the circuit component 50 to the inner surrounding wall 41 by any well-known manners, such as a bayonet connection, a screw connection, a fastening connection, etc.

In an embodiment shown in FIGS. 2 and 3, the outer housing 3 may further include two end caps 32 each having an inward surface which includes an inner coupling region 322 and an outer coupling region 323. The inner coupling region 322 extends about the longitudinal axis (L). The outer coupling region 323 extends to surround the inner coupling region 322. The inner and outer coupling regions 322, 323 are configured such that once the end caps 32 are secured to the outer surrounding wall 31 respectively at two opposite sides thereof, the inner and outer coupling regions 322, 323 are brought into fluid-tight sealing engagement with the respective inner wall end 411 of the inner surrounding wall 41 and the respective outer wall end 311 of the outer surrounding wall 31, respectively, to thereby seal the internal chamber 310.

In an embodiment shown in FIGS. 2 and 3, the modular underwater lighting apparatus 2 may further include two inner seal rings 301 and two outer seal rings 302. Each of the inner seal rings 301 is provided between the respective inner wall end 411 of the inner surrounding wall 41 and the inner coupling region 322 of the respective end cap 32, and each of the outer seal rings 302 is provided between the respective outer wall end 311 of the outer surrounding wall 31 and the outer coupling region 323 of the respective end cap 32.

In an embodiment shown in FIG. 2, each of the end caps 32 may have a peripheral marginal zone 324, and the modular underwater lighting apparatus 2 may further include a plurality of fastening members 7 which are disposed separately about an outer peripheral surface of the outer surrounding wall 31. Each of the fastening members 7 is configured to secure the peripheral marginal zone 324 of one of the end caps 32 to the peripheral marginal zone 324 of the other one of the end caps 32, so as to permit the end caps 32 to be secured to the outer surrounding wall 31 respectively at the two opposite sides thereof.

In an embodiment shown in FIG. 2, each of the fastening members 7 may include an elongated rod 71 with two opposite male-threaded ends 711, and two nuts 72 each having a female-threaded portion 721. The elongated rod 71 extends through the peripheral marginal zones 324 of the end caps 32 with each of the male-threaded ends disposed upwardly or downwardly of the respective end cap 32. The female-threaded portions 721 of the two nuts are brought into threadedly engagement with the male-threaded ends 711, respectively, so as to tighten the end caps 32 respectively against the outer wall ends 311 to thereby secure the end caps 32 to the outer surrounding wall 31 respectively at the two opposite sides thereof.

Figure 5:
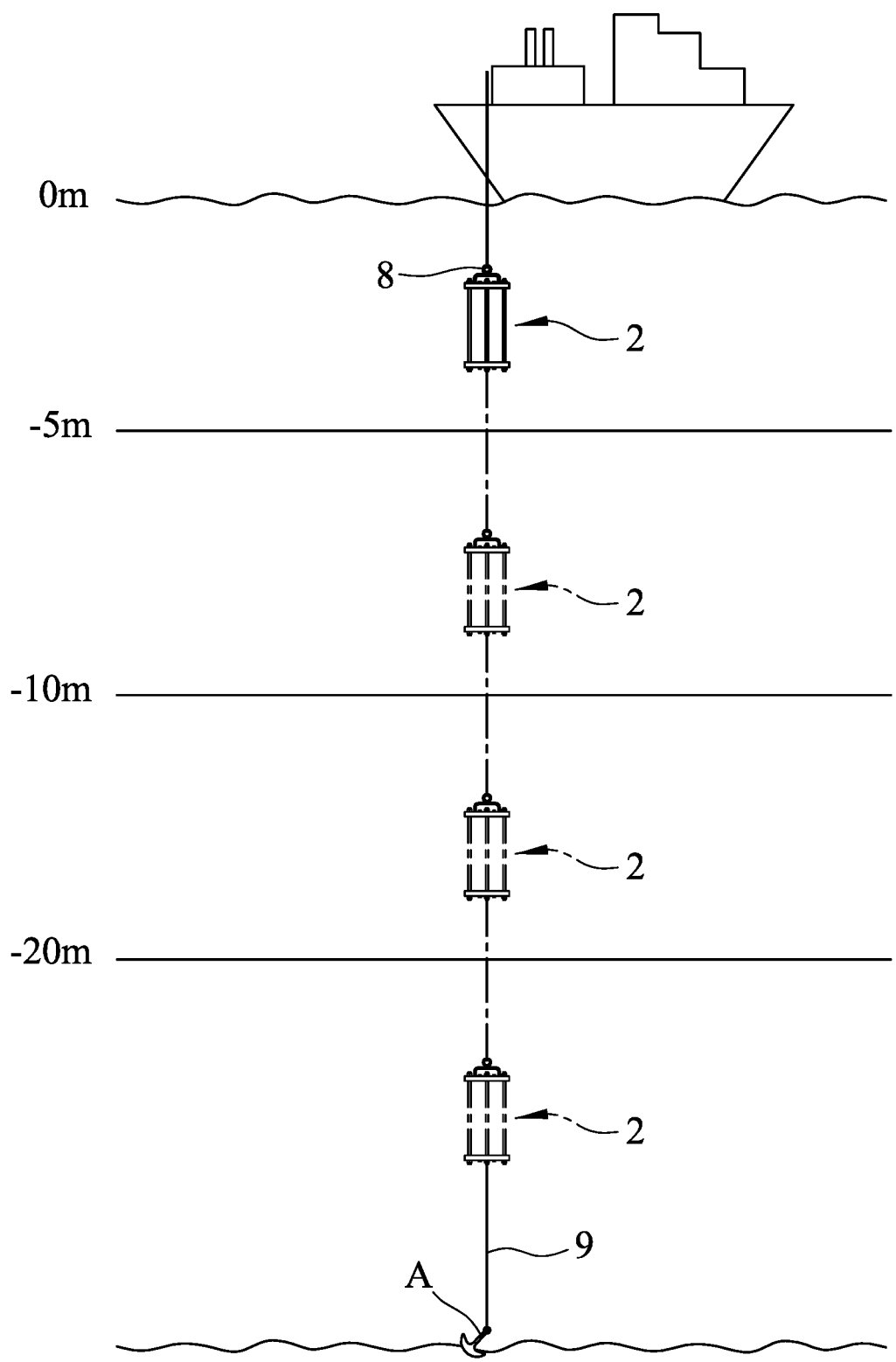
FIG. 5 is a schematic view illustrating that the first embodiment may be moved along an anchor chain.

In an embodiment shown in FIGS. 2 and 3, each of the end caps 32 has a through bore 321 extending along the longitudinal axis (L), and the inner surrounding wall 41 has an inner peripheral surface defining a passage 410 which is in spatial communication with the through bores 321 of the end caps 32 once the end caps 32 are secured to the outer surrounding wall 31 respectively at the two opposite sides thereof. As shown in FIGS. 3 and 5, a rope 81 may be connected to a lug 8 of the modular underwater lighting apparatus 2, and an anchor chain 9, which has a bottom end connected to an anchor (A) positioned at the bottom of the water, may pass through the passage 410 and the through bores 321 of the end caps 32 to permit the modular underwater lighting apparatus 2 to move along the anchor chain 9 by winding or unwinding of the rope 81.

Figure 6:
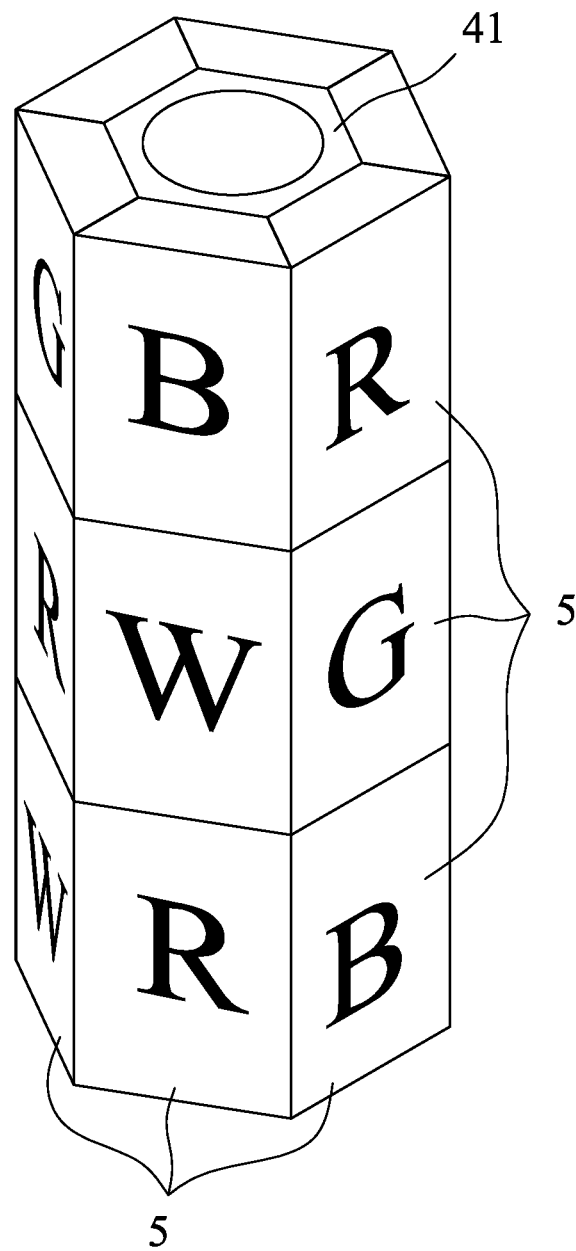
FIG. 6 is a schematic view illustrating that lights emitting from different light emitting elements may be added together to produce a mixed light having the desired wavelength.

In an embodiment shown in FIGS. 2 and 6, the light emitting elements 52 of the light modules 51 of the lighting devices 5 are configured to emit different colors of light. The lighting devices 5 represented by the letters "R," "G," "B," and "W" emit light of red, green, blue, and white colors, respectively. The lights emitting from the lighting devices 5 of the same row may be added together to have one mixed color, while the lights emitting from the lighting devices 5 in the same level may be added together to have another mixed color. In addition, the modular underwater lighting apparatus 2 may further include a controller 6. The controller 6 is electrically connected to the circuit component 50 of each of the lighting devices 5 so as to permit a user to remotely control the switching on or off the light emitting element 52 of each of the lighting devices 5 such that the modular underwater lighting apparatus 2 may emit light of a selected wavelength. Furthermore, the controller 6 may control and change the luminance and the flickering frequency of the light emitted from each light emitting element 52, through which the brightness, the wavelength, and the flickering frequency of the mixed light from the modular underwater lighting apparatus 2 may be adjusted for attracting fish of different species or fish in different depths. Additionally, the modular underwater lighting apparatus 2 may be used as a means for transmitting message underwater.

Figure 7:
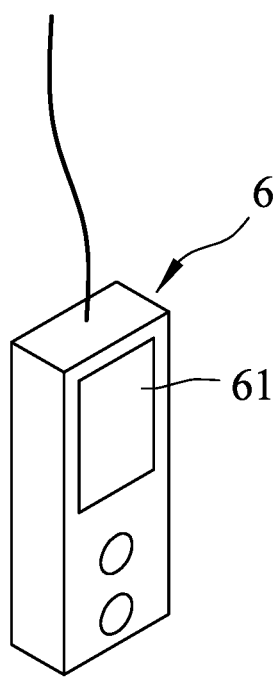
FIG. 7 is a schematic view illustrating a controller with a modified configuration.

In a modified embodiment shown in FIG. 7, the controller 6 may include a main control board (not shown) and a liquid crystal display module which includes a liquid crystal display panel 61, a control integrated circuit chip (not shown), and a microprocessor (not shown) for processing commands.

Figure 8:
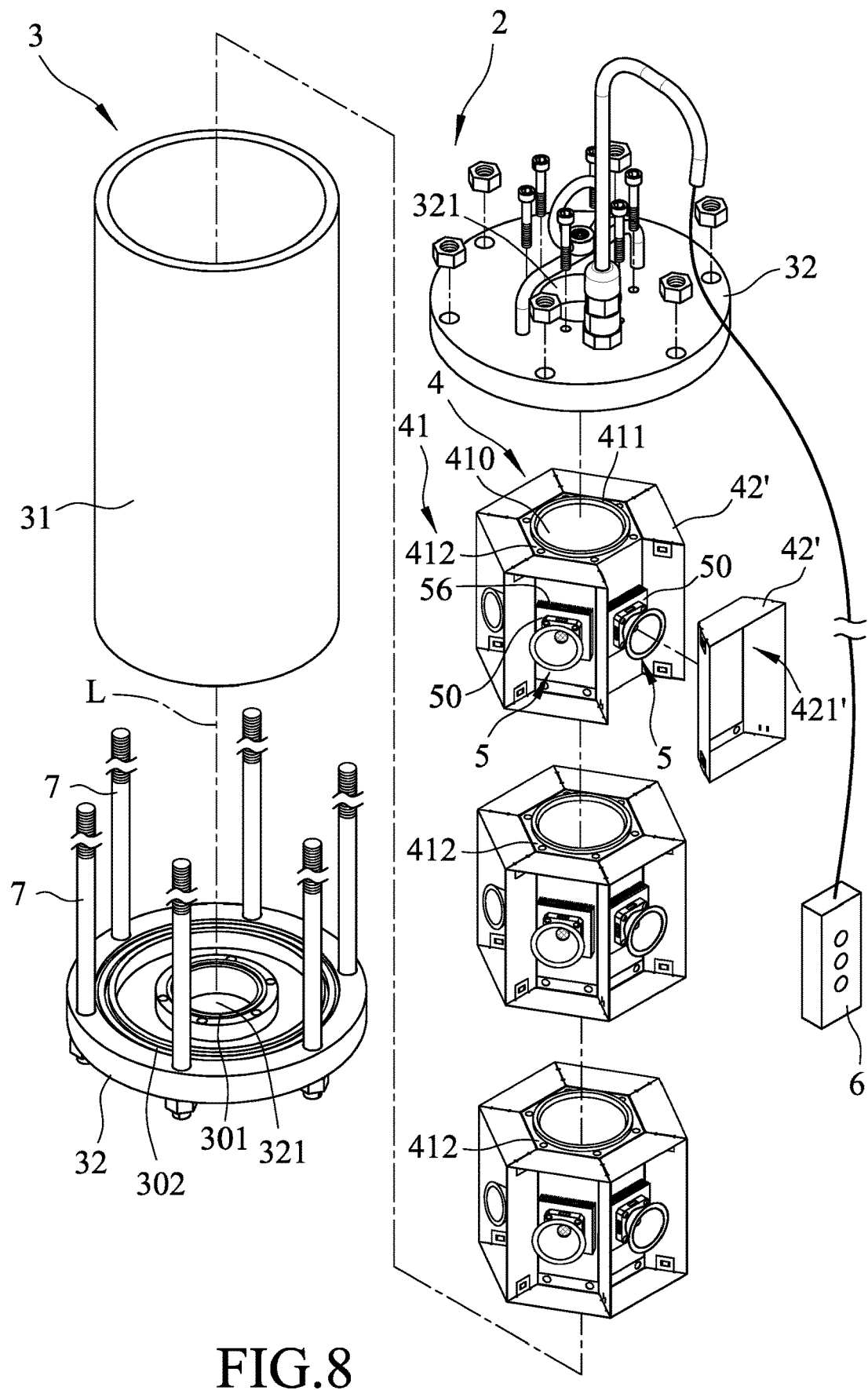
FIG. 8 is a partial exploded perspective view of a modular underwater lighting apparatus according to a second embodiment of the disclosure.
Figure 9:
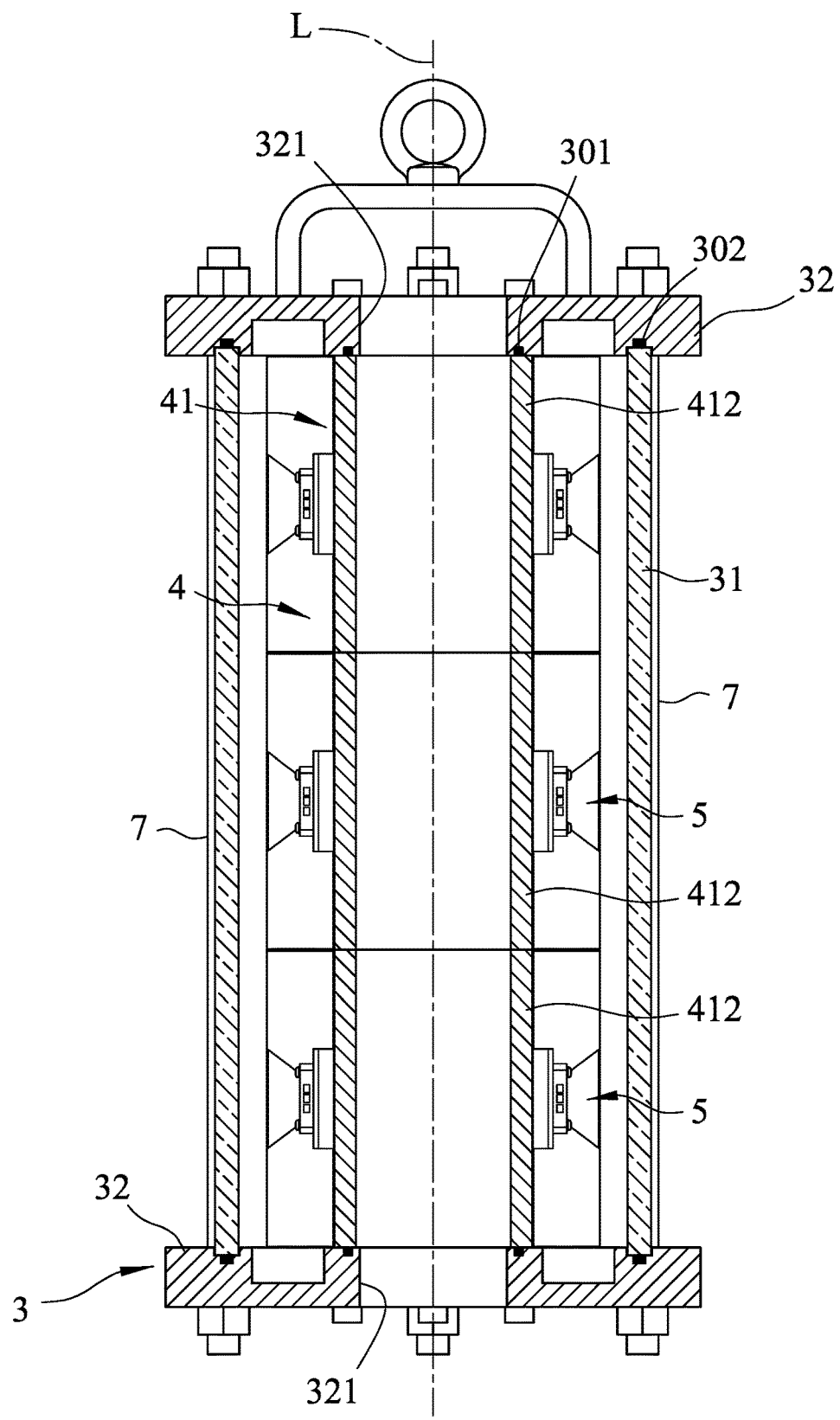
FIG. 9 is a partial cross-sectional view of the second embodiment.

FIGS. 8 and 9 illustrate a modular underwater lighting apparatus 2 according to a second embodiment of the disclosure. The second embodiment is similar to the first embodiment, except that, in the second embodiment, the inner surrounding wall 41 has a plurality of wall segments 412 which are displaced from each other in the direction of the longitudinal axis (L), and which are detachable from each other. In this case, a user may stack a desire number of the wall segments 412, and may select the outer surrounding wall 31 and the fastening members 7 with corresponding heights, to thereby change the change the height of the modular underwater lighting apparatus 2.

In an embodiment shown in FIG. 8, a plurality of positioning frames 42' are mounted on each of the wall segments 412 to be displaced from each other about the longitudinal axis. Each of the positioning frames defines a positioning groove 421' for receiving and positioning a respective one of the lighting devices 5.

In other non-shown embodiment, a plurality of the outer surrounding walls 31 may be provided, and each of the wall segments 412 may be sealed inside the respective outer surrounding wall 31. The outer surrounding walls may be secured to each other through a bayonet connection or a screw connection. A user may stack a desire number of the outer surrounding walls 31 to change the height of the modular underwater lighting apparatus 2.

In the description above, for the purposes of explanation, numerous specific details have been set forth in order to provide a thorough understanding of the embodiment (s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is (are) considered the exemplary embodiment (s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A modular underwater lighting apparatus comprising:
an outer housing including an outer surrounding wall which extends to surround a longitudinal axis, and which is made of a light-transmissive material;
a supporting mount mounted inside said outer housing; and
a plurality of lighting devices separately mounted on said supporting mount, each of said lighting devices including a circuit component and a lighting module which is detachably mounted to said circuit component, wherein
said outer surrounding wall has two opposite outer wall ends in a direction of the longitudinal axis;
said supporting mount includes an inner surrounding wall which extends to surround the longitudinal axis, and which has two opposite inner wall ends in the direction of the longitudinal axis, said inner surrounding wall being disposed inwardly of said outer surrounding wall so as to define an internal chamber between said outer and inner surrounding walls;
said lighting devices are separately mounted on said inner surrounding wall to be disposed in said internal chamber;
said outer housing further includes two end caps each having an inward surface which includes an inner coupling region extending about the longitudinal axis, and an outer coupling region extending to surround said inner coupling region, said inner and outer coupling regions being configured such that, once said end caps are secured to said outer surrounding wall respectively at two opposite sides thereof, said inner and outer coupling regions are brought into fluid-tight sealing engagement with said respective inner wall end of said inner surrounding wall and said respective outer wall end of said outer surrounding wall, respectively, to thereby seal said internal chamber; and
said lighting module includes
a light emitting element configured to be brought into electrical contact with said circuit component, and
a mounting frame configured to detachably couple said light emitting element to said circuit component so as to bring said light emitting element into electrical contact with said circuit component and so as to permit light from said light emitting element to pass through said mounting frame to emanate outwardly.

2. The modular underwater lighting apparatus according to claim 1, wherein each of said end caps has a peripheral marginal zone, said modular underwater lighting apparatus further comprising a plurality of fastening members which are disposed separately about an outer peripheral surface of said outer surrounding wall, each of said fastening members being configured to secure said peripheral marginal zone of one of said end caps to said peripheral marginal zone of the other one of said end caps so as to permit said end caps to be secured to said outer surrounding wall respectively at the two opposite sides thereof.

3. The modular underwater lighting apparatus according to claim 1, wherein each of said end caps has a through bore extending along the longitudinal axis, and said inner surrounding wall has an inner peripheral surface defining a passage which is in spatial communication with said through bores of said end caps once said end caps are secured to said outer surrounding wall respectively at the two opposite sides thereof.

4. The modular underwater lighting apparatus according to claim 1, wherein said lighting module further includes a lens mounted to encapsulate said light emitting element.

5. The modular underwater lighting apparatus according to claim 1, wherein said light emitting element is a chip-on-board light emitting diode or a light emitting diode chip.

6. The modular underwater lighting apparatus according to claim 1, wherein said lighting module further includes a reflective cup disposed on said mounting frame for reflecting the light from said light emitting element.

7. The modular underwater lighting apparatus according to claim 1, wherein said light emitting elements of said light modules of said lighting devices are configured to emit different colors of light, said modular underwater lighting apparatus further comprising a controller which is electrically connected to said circuit component of each of said lighting devices so as to control the switching on or off said light emitting element of each of said lighting devices to thereby permit said modular underwater lighting apparatus to emit light of a selected wavelength.

8. The modular underwater lighting apparatus according to claim 1, wherein each of said lighting devices further includes a heat sink disposed between said circuit component and said inner surrounding wall.

9. The modular underwater lighting apparatus according to claim 1, wherein said supporting mount further includes a plurality of positioning frames which are respectively mounted on said inner surrounding wall, and which are displaced from each other about the longitudinal axis, said positioning frames being configured to arrange said lighting devices into a plurality of rows of said lighting devices.

10. The modular underwater lighting apparatus according to claim 9, wherein each of said positioning frames defines a positioning groove for receiving and positioning a respective one of said rows of said lighting devices.

11. The modular underwater lighting apparatus according to claim 1, wherein said inner surrounding wall has a plurality of wall segments which are displaced from each other in the direction of the longitudinal axis, and which are detachable from each other.

12. The modular underwater lighting apparatus according to claim 11, wherein a plurality of positioning frames are mounted on each of said wall segments to be displaced from each other about the longitudinal axis, each of said positioning frames defining a positioning groove for receiving and positioning a respective one of said lighting devices.

* * * * *